United States Patent
Deng et al.

(10) Patent No.: US 8,509,794 B2
(45) Date of Patent: Aug. 13, 2013

(54) METHOD AND APPARATUS FOR CONTROLLING USER EQUIPMENTS

(75) Inventors: Mingyi Deng, Chengdu (CN); Xu Tian, Chengdu (CN); Qiongtao Ren, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/457,028

(22) Filed: Apr. 26, 2012

(65) Prior Publication Data

US 2012/0208518 A1 Aug. 16, 2012

Related U.S. Application Data

(63) Continuation of application No. PCT/CN2011/074821, filed on May 28, 2011.

(30) Foreign Application Priority Data

Jun. 28, 2010 (CN) .......................... 2010 1 0212987

(51) Int. Cl.
*H04W 72/00* (2009.01)
(52) U.S. Cl.
USPC ......... 455/450; 455/562.1; 455/525; 370/320
(58) Field of Classification Search
USPC .............. 455/343.4, 436–444, 458, 561, 574; 370/311, 318, 328, 338
See application file for complete search history.

(56) References Cited

U.S. PATENT DOCUMENTS 4,961,188 A * 10/1990 Lau ............................... 370/517
8,149,788 B1 * 4/2012 Vargantwar ................... 370/331
(Continued)

FOREIGN PATENT DOCUMENTS

CN 101466125 A 6/2009
CN 101541101 A 9/2009
(Continued)

OTHER PUBLICATIONS

"$3^{rd}$ Generation Partnership Project Technical Specification Group Radio Access Network; User Equipment (UE) procedures in idle mode and procedures for cell reselection in connected mode (Release 9)", 3GPP Standard; 3GPP TS 25.304, $3^{rd}$ Generation Partnership Project (3GPP), Mobile Competence Centre; 650, No. V9.2.0, XP050441889, pp. 1-50 (2010).

(Continued)

*Primary Examiner* — Kamran Afshar
*Assistant Examiner* — Marisol Fahnert
(74) *Attorney, Agent, or Firm* — Staas & Halsey LLP (57) ABSTRACT

An apparatus for controlling User Equipments (UEs) in a communication system including a source cell and a destination cell is provided. A frequency and the scrambling codes of signals transmitted by a base station of the destination cell are the same as a frequency and scrambling codes of signals transmitted by a base station of the source cell. After the UE receives the signals, the signals are regarded as being transmitted by the source cell, and the UE is woken up by information over a Paging Indication Channel (PICH) and a Paging Channel (PCH), and then the UE reads information configured by the destination cell and carried over the common channel of the signals, and performs corresponding operations according to the information. The information over the PICH and the PCH wakes up the specified UE.

10 Claims, 3 Drawing Sheets

(56) References Cited

U.S. PATENT DOCUMENTS

| | | | |
|---|---|---|---|
| 2007/0260851 A1* | 11/2007 | Taha et al. | 712/204 |
| 2008/0043658 A1* | 2/2008 | Worrall | 370/312 |
| 2009/0238149 A1 | 9/2009 | Kawabata | |
| 2010/0284319 A1* | 11/2010 | Wang et al. | 370/312 |

FOREIGN PATENT DOCUMENTS

| | | |
|---|---|---|
| CN | 101754306 A | 6/2010 |
| CN | 101883365 A | 11/2010 |
| TW | 201034487 A | 9/2010 |
| WO | WO 2010/066165 A1 | 6/2010 |
| WO | WO 2010/149293 A1 | 12/2010 |

OTHER PUBLICATIONS

"3$^{rd}$ Generation Partnership Project; Technical Specification Group Radio Access Network; Radio Resource Control (RRC); Protocol specification (Release 9)", 3GPP Standard; 3GPP TS 25.331, 3$^{rd}$ Generation Partnership Project (3GPP), Mobile Competence Centre; 650, No. V9.3.0, XP050441896, pp. 1-1785 (2010).

Extended European Search Report issued May 10, 2012, in Munich in corresponding European Application No. EP 11 77 7253.

English-language International Search Report in International Application No. PCT/CN2011/074821 mailed Sep. 1, 2011.

* cited by examiner

A base station of the destination cell transmits signals at a first frequency, where: the first frequency is the same as a frequency of signals transmitted by a base station of the source cell, scrambling codes used for transmitting the signals are the same as scrambling codes of the signals transmitted by the base station of the source cell, and a PICH and a PCH in the signals transmitted at the first frequency bear information for waking up a specified UE; a common channel in the signals transmitted at the first frequency bears information configured by the base station of the destination cell; and the information configured by the base station of the destination cell is designed to control the woken specified UE to perform corresponding operations ⸺ S1

The base station of the destination cell transmits signals at a second frequency, where the second frequency is different from the frequency of the signals transmitted by the base station of the source cell ⸺ S2

METHOD AND APPARATUS FOR
CONTROLLING USER EQUIPMENTS

This application is a continuation of International Application No. PCT/CN2011/074821, filed on May 28, 2011, which claims priority to Chinese Patent Application No. 201010212987.5, filed with the Chinese Patent Office on Jun. 28, 2010 and entitled "METHOD AND APPARATUS FOR CONTROLLING USER EQUIPMENTS", both of which are incorporated herein by reference in their entirety.

FIELD OF THE INVENTION

The present invention relates to the field of communication technologies, and in particular, to a method and an apparatus for controlling User Equipments (UEs).

BACKGROUND OF THE INVENTION

The 3rd Generation (3G) mobile communication system has been applied commercially around the world. With increase of users, the traffic is increasing, and users raise higher requirements on Quality of Service (QoS) provided by the 3G mobile communication network. In the existing mobile services, obstacles such as indoor walls lead to loss of signals, and the indoor signals of the UE are of low quality, which reduces communication quality of users.

To solve such problems, a Femtocell base station technology is introduced. A Femtocell base station may be set at home, which saves costs of equipment room, power supply, air conditioning, and circuit maintenance. The Femtocell base station provides good indoor coverage, the coverage radius of the Femtocell base station is small, and the accessing UEs decrease the transmitting power of the Femtocell base station, which saves power of batteries and reduces radiation on human body. Compared with the coverage scope of a macro cell, the coverage scope of a Femtocell base station is very small. A macro cell may include dozens of or even hundreds of Femtocell base stations.

User Equipments (UEs) residing in any area of a macro cell may receive the same system message. Different UEs covered by different Femtocells in the macro cell, different UEs covered by the same Femtocell in the macro cell, and UEs outside the coverage of the Femtocell in the macro cell receive the same system message and accept control exercised by the base station in the macro cell so long as the UEs still reside in the macro cell, which makes it impossible to provide differentiated services for UEs in the macro cell.

SUMMARY OF THE INVENTION

Embodiments of the present invention provide a method and an apparatus for controlling UEs, so as to provide differentiated services for UEs residing in the same cell.

An embodiment of the present invention provides a method for controlling UEs. The method is applicable to a communication system inclusive of a source cell and a destination cell, and includes:

transmitting, by a base station of the destination cell, signals at a first frequency, where: the first frequency is the same as a frequency of signals transmitted by a base station of the source cell, scrambling codes used for transmitting the signals are the same as scrambling codes of the signals transmitted by the base station of the source cell, and a Paging Indication Channel (PICH) and a Paging Channel (PCH) in the signals transmitted at the first frequency bear information for waking up a specified UE; a common channel in the signals transmitted at the first frequency bears information configured by the base station of the destination cell; and the information configured by the base station of the destination cell is designed to control the woken specified UE to perform corresponding operations.

Another embodiment of the present invention provides an apparatus for controlling UEs. The apparatus is applicable to a communication system inclusive of a source cell and a destination cell, and includes:

a first transmitting unit, adapted to transmit signals at a first frequency, where: the first frequency is the same as a frequency of signals transmitted by a base station of the source cell, scrambling codes used for transmitting the signals are the same as scrambling codes of the signals transmitted by the base station of the source cell, and a PICH and a PCH in the signals transmitted at the first frequency bear information for waking up a specified UE; a common channel in the signals transmitted at the first frequency bears information configured by the base station of the destination cell; and the information configured by the base station of the destination cell is designed to control the woken specified UE to perform corresponding operations.

In the embodiments of the present invention, the base station in the destination cell transmits broadcast signals; and the frequency and the scrambling codes of the signals transmitted by the base station of the destination cell are the same as the frequency and the scrambling codes of the signals transmitted by the base station of the source cell. Therefore, after the UE receives the signals in the process of moving from the source cell to the destination cell, the signals are regarded as being transmitted by the base station of the source cell, and the UE is woken by the information over the PICH and the PCH, and then the UE reads the information configured by the destination cell and carried over the common channel of the signals, and performs corresponding operations according to the read information. The information over the PICH and the PCH wakes up the specified UE. Therefore, different UEs are woken up by the base station of the destination cell to perform different operations, and different UEs obtain differentiated services.

BRIEF DESCRIPTION OF THE DRAWINGS

To describe the technical solutions of the present invention more clearly, the following outlines the accompanying drawings involved in the embodiments of the present invention. Apparently, the accompanying drawings outlined below are not exhaustive, and persons of ordinary skill in the art can derive other drawings from them without any creative effort.

DETAILED DESCRIPTION OF THE EMBODIMENTS

An embodiment of the present invention provides a method for controlling UEs. In the embodiments of the present invention, the frequency and the scrambling codes of the signals transmitted by the base station of the destination cell are the same as the frequency and the scrambling codes of the signals transmitted by the base station of the source cell. The transmitting of the signals may be synchronous or not synchronous to the transmitting of the signals inclusive of common channel information from the base station of the source cell of the UE. Therefore, the UE receives the signals transmitted by the base station of the destination cell but regards the signals as being transmitted by the base station of the source cell. There are many scenarios for the UE to receive the signals transmitted by the base station of the destination cell. For example, the UE receives the signals transmitted by the base station of the destination cell in the process of moving from the source cell to the destination cell. Specifically, the UE may be in the source cell or in the destination cell. The common channel information included in the signals transmitted by the base station of the destination cell is different from the common channel information of the source cell. Therefore, the UE can obtain the information configured by the destination cell according to the information carried over the common channel and included in the signals transmitted by the destination cell. The UE performs specific operations according to the information configured by the base station of the destination cell.

The base stations of different destination cells configure different information, and the UE performs different operations according to the information configured by the base station of the destination cell. In the subsequent embodiment, it is assumed that the source cell of the UE is a macro cell, and the destination cell is a Femtocell in the macro cell, namely, the base station of the destination cell is a Femtocell base station.

Further, a corresponding apparatus is provided in an embodiment of the present invention. The method and the apparatus are detailed below.

Figure 1:
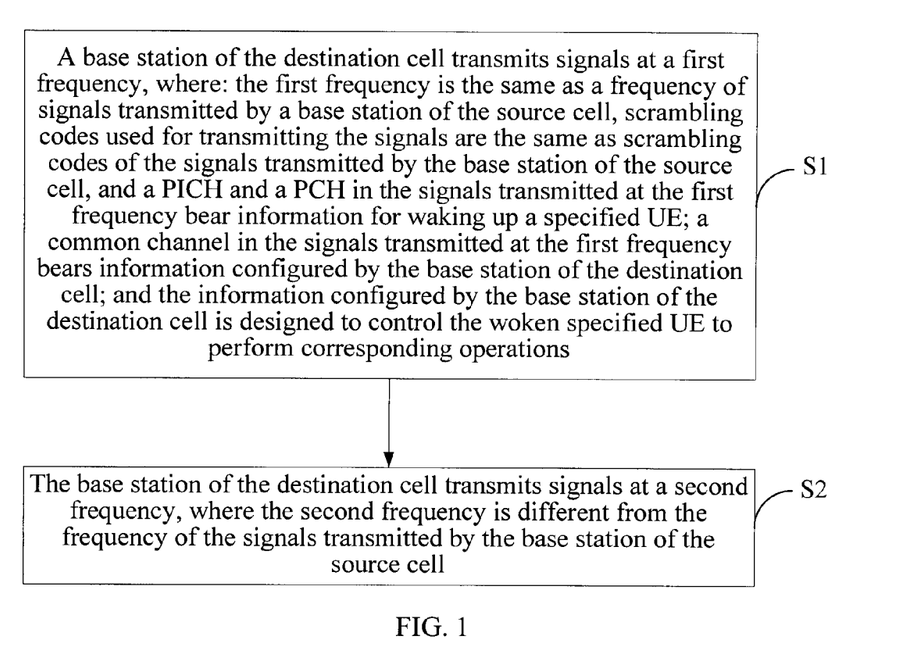
FIG. 1 is a flowchart of a method for controlling UEs according to an embodiment of the present invention.

FIG. 1 is a flowchart of a method for controlling UEs according to an embodiment of the present invention. This method is applicable to a communication system inclusive of a source cell and a destination cell, and includes the following steps:

Step S1: A base station of the destination cell transmits signals at a first frequency, where: the first frequency is the same as a frequency of signals transmitted by a base station of the source cell, scrambling codes used for transmitting the signals are the same as scrambling codes of the signals transmitted by the base station of the source cell, and a PICH and a PCH in the signals transmitted at the first frequency bear information for waking up a specified UE; a common channel in the signals transmitted at the first frequency bears information configured by the base station of the destination cell; and the information configured by the base station of the destination cell is designed to control the woken specified UE to perform corresponding operations.

Specifically, the source cell of the UE may be a macro cell; and the base station of the destination cell, which performs this method, may be a home base station in the macro cell. The base station of the destination cell transmits signals at the first frequency, the first frequency is the same as the frequency of the signals transmitted by the base station of the source cell, and the scrambling codes used for transmitting the signals are the same as the scrambling codes of the signals transmitted by the base station of the source cell. Therefore, in the process of moving from the source cell to the destination cell, the UE receives the signals transmitted by the base station of the destination cell at the first frequency but regards the signals (inclusive of the common channel information) as being transmitted by the base station of the source cell. The UE resolves the information over the PICH and the PCH, and finds itself paged by the base station that transmits the signals.

Therefore, the UE resolves the signals to obtain the information configured by the destination cell and carried on the common channel. The UE performs the corresponding operations according to the obtained information configured by the destination cell.

The information configured by the destination cell may include: a first parameter, which instructs the woken specified UE to perform inter-frequency measurement and reselect a cell; or a second parameter, which instructs the woken specified UE to perform inter-system reselection; or a third parameter, which instructs the woken specified UE to initiate setup of a Radio Resource Control (RRC) connection, or other control parameters, or any combination thereof.

For example, the UE receives the signals transmitted by the base station of the destination cell at the first frequency, the signals include an inter-frequency measurement threshold, and the UE performs inter-frequency measurement and reselects a cell according to the inter-frequency measurement threshold and the network-side measurement result; or, the signals sent by the destination cell at the first frequency include a paging type parameter, and the UE initiates setup of an RRC connection to the base station of the destination cell upon receiving the paging type parameter; or, the signals transmitted by the base station of the destination cell at the first frequency include an inter-system reselection parameter, and the UE initiates inter-system reselection upon receiving the inter-system reselection parameter.

Further, the signals transmitted at the first frequency in step S1 may be synchronous to the signals transmitted by the macro cell or not. If they are synchronous, the UE can easily resolve the signals received in step S1 to obtain the information in the signals; if they are not synchronous, the UE may synchronize with the signals, and then resolve the signals to obtain the information in the signals.

This method may further include step S2. Step S2 is a description for facilitating understanding of the technical solutions of the present invention, but not a mandatory step for addressing technical issues of the present invention.

Step S2: The base station of the destination cell transmits signals at a second frequency, where the second frequency is different from the frequency of the signals transmitted by the base station of the source cell.

The base station of the destination cell performs step S2, and transmits signals at a frequency different from the frequency of the signals transmitted by the base station of the source cell of the UE, and therefore, the cell generated by the coverage scope of such signals is a cell capable of providing services for the UE. After the base station of the destination cell performs step S2, the generated cell may be a cell capable of providing services.

While the UE moves from the source cell to the destination cell, the UE receives the signals transmitted in step S1; and the UE performs inter-frequency measurement and reselects a cell if the information configured by the destination cell and obtained by the UE from the common channel includes an inter-frequency measurement threshold (such as value of parameter "Sintersearch") and neighboring cell information, where the neighboring cell information includes at least scrambling number and frequency of the neighboring cell, and, if the UE determines that the quality of the measured source cell signals is lower than the inter-frequency measurement threshold. The neighboring cell information is the information about the cell (namely, destination cell) generated by the coverage scope of the signals transmitted by the base station of the destination cell at the second frequency.

The information, which is configured by the destination cell and obtained by the UE from the signals transmitted at the first frequency, is a parameter which instructs the UE to initiate setup of an RRC connection or a parameter which instructs the UE to initiate inter-system reselection, or other information.

In the method for controlling UEs in FIG. 1, the frequency and the scrambling codes of the signals transmitted by the base station of the destination cell are the same as the frequency and the scrambling codes of the signals transmitted by the base station of the source cell; after the UE receives the signals in the process of moving from the source cell to the destination cell, the signals are regarded as being transmitted by the base station of the source cell, and the UE is woken by the information over the PICH and the PCH, and then the UE reads the information configured by the destination cell and carried over the common channel of the signals, and performs corresponding operations according to the read information. The information over the PICH and the PCH wakes up the specified UE. Therefore, different UEs are woken up by the base station of the destination cell to perform different operations, and different UEs obtain differentiated services. The source cell mentioned here may be a macro cell.

Figure 2:
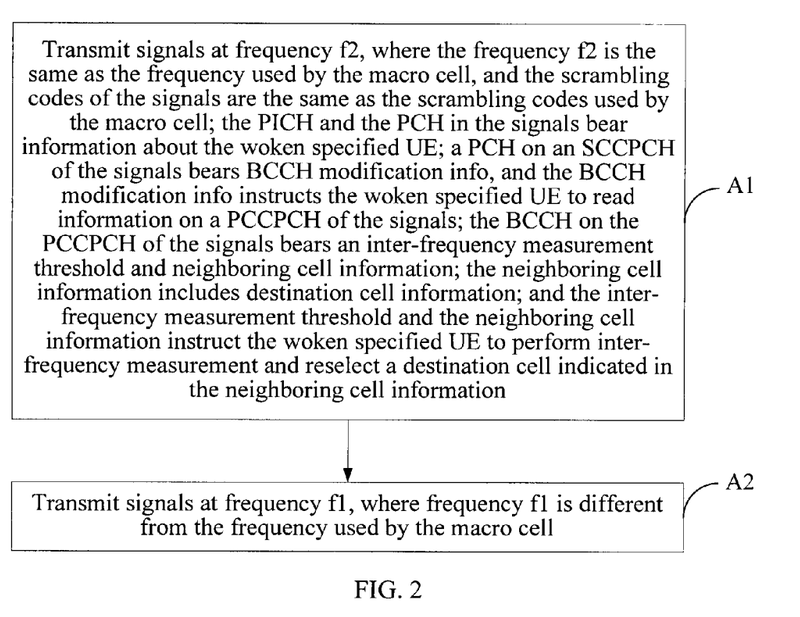
FIG. 2 is a flowchart of another method for controlling UEs according to an embodiment of the present invention.

FIG. 2 is a flowchart of a method for controlling UEs according to an embodiment of the present invention. In this embodiment, it is assumed that the macro cell is a source cell, and the Femtocell is a destination cell. The method is performed by a base station in the Femtocell, and specifically, may be performed by a home base station.

The method includes the following steps:

Step A1: Transmit signals at frequency f2, where the frequency f2 is the same as the frequency used by the macro cell, and the scrambling codes of the signals are the same as the scrambling codes of the signals transmitted by the base station of the macro cell; the PICH and the PCH in the signals bear information about the woken specified UE; a PCH on a Subordinate Common Control Physical Channel (SCCPCH) of the signals bears Broadcast Control Channel (BCCH) modification info, and the BCCH modification info instructs the woken specified UE to read information on a Principal Common Control Physical Channel (PCCPCH) of the signals; the BCCH on the PCCPCH of the signals bears an inter-frequency measurement threshold and neighboring cell information; the neighboring cell information includes destination cell information; and the inter-frequency measurement threshold and the neighboring cell information instruct the woken specified UE to perform inter-frequency measurement and reselect a destination cell indicated in the neighboring cell information.

Figure 3:
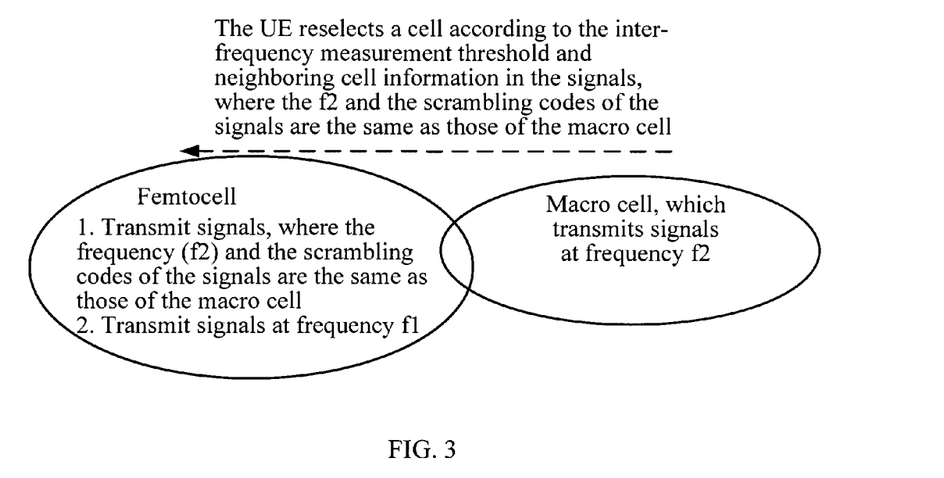
FIG. 3 is a schematic diagram of cell coverage when a UE moves from a macro cell to a Femtocell.

In the cell shown in FIG. 3, the frequency and the scrambling codes of the signals transmitted by the home base station are the same as the frequency and the scrambling codes of the signals transmitted by the base station of the source cell. Therefore, after the UE receives the signals transmitted at frequency f2 in the process of moving from the macro cell to the Femtocell, the UE regards the signals as being transmitted by the base station of the macro cell according to the scrambling codes and the frequency of the signals. The UE reads the information of waking up the specified UE, where the information is carried on the PICH and the PCH of the received signals. The UE determines that the macro cell needs to wake up the UE. Therefore, the UE reads information on the PCH. The PCH is a logical channel, and is mapped onto the SCCPCH so that the information on the PCH is sent to the UE. The UE reads the information element "BCCH modification info" on the PCH, and continues to read the information on the BCCH. The BCCH is a transmission channel mapped onto the PCCPCH so that the information on the BCCH is sent to the UE.

The information carried on the BCCH includes the information preset on the home base station. The UE reads the preset information and performs inter-frequency measurement to reselect the Femtocell as a serving cell, where the Femtocell is covered by the home base station and is a destination cell. The preset information may include an inter-frequency measurement threshold and neighboring cell information. The neighboring cell information may be scrambling codes and frequency (f1) used by the Femtocell covered by the home base station. The UE performs inter-frequency measurement to reselect a cell if the UE determines that the quality of the measured source cell signals is lower than the inter-frequency measurement threshold after reading the inter-frequency measurement threshold (such as value of the parameter "Sintersearch") on the BCCH and the neighboring cell information.

The method may further include:

Step A2: Transmit signals at frequency f1, where frequency f1 is different from the frequency used by the macro cell.

After the home base station performs step A2, the scope covered by the signals transmitted at frequency f1 forms the true cell capable of providing services and corresponding to the Femtocell. The home base station performs step A1, and the transmitted signals trigger the UE to perform inter-frequency measurement and reselection. The UE may have already entered the scope of the Femtocell, and therefore, at the time of reselecting a cell at a different frequency, the UE chooses to reside in a Femtocell which is generated by a scope covered by the signals transmitted by the home base station at frequency f1, namely, reside in the destination cell.

In the foregoing example, the frequency and the scrambling codes of the signals transmitted by the home base station in the Femtocell are the same as the frequency and the scrambling codes of the signals transmitted by the base station of the source cell, and therefore, the specified UE that moves from the macro cell to the Femtocell is woken by the wakeup information on the PICH and the PCH, and the UE reads other information on the common channel in the signals transmitted at frequency f2, performs inter-frequency measurement, reselects a cell, and chooses to reside in the Femtocell.

In another example, when the UE moves from a macro cell to a Femtocell, the frequency and the scrambling codes of the signals transmitted by the base station in the Femtocell are the same as the frequency and the scrambling codes of the signals transmitted by the base station of the source cell; therefore, after the UE receives the signals transmitted by the home base station, the UE regards the signals as being transmitted by the base station of the macro cell, and the UE is woken by the information on the PICH and the PCH, and then the UE reads other information on the common channel of the signals, and performs corresponding operations such as inter-system reselection or initiation of setup of an RRC connection. That is, the home base station in the Femtocell imitates the device in the macro cell to transmit signals inclusive of common channel information, controls the specific UE that moves from the macro cell to the Femtocell, and makes the UE perform corresponding operations. Therefore, the signals transmitted by the home base station in the Femtocell by imitating the device in the macro cell include common channel information. For details of such signals, see the signals inclusive of common channel information and transmitted by the macro cell in the prior art. FIG. 2 above illustrates a method for controlling UEs, and shall not be construed as limitation on the present invention. The common channel information configured in the home base station in the Femtocell may also be other information which exercises different control on the UE, for example, controls the UE to perform inter-system reselection or initiate setup of an RRC connection.

Figure 4:
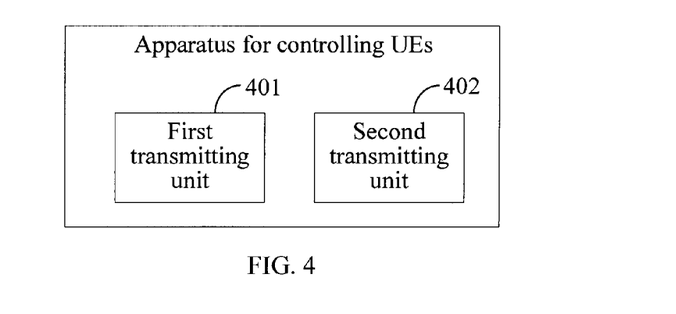
FIG. 4 is a schematic diagram of an apparatus for controlling UEs according to an embodiment of the present invention.

FIG. 4 is a schematic diagram of an apparatus for controlling UEs according to an embodiment of the present invention. The apparatus includes a first transmitting unit 401.

The first transmitting unit 401 is adapted to transmit signals at a first frequency, where: the first frequency is the same as a frequency of signals transmitted by a base station of the source cell, scrambling codes used for transmitting the signals are the same as scrambling codes of the signals transmitted by the base station of the source cell, and a PICH and a PCH in the signals transmitted at the first frequency bear information for waking up a specified UE; a common channel in the signals transmitted at the first frequency bears information configured by the base station of the destination cell; and the information configured by the base station of the destination cell is designed to control the woken specified UE to perform corresponding operations.

The information configured by the destination cell may include: a first parameter, which instructs the woken specified UE to perform inter-frequency measurement and reselect a cell; or a second parameter, which instructs the woken specified UE to perform inter-system reselection; or a third parameter, which instructs the woken specified UE to initiate setup of an RRC connection.

The apparatus may further include a second transmitting unit 402. The second transmitting unit is given here to facilitate understanding of the technical solutions of the present invention, but is not mandatory for addressing technical issues of the present invention.

The second transmitting unit 402 is adapted to transmit signals at a second frequency. The second frequency is different from the frequency of the signals transmitted by the base station of the source cell, and the signals transmitted at the second frequency carry common channel information.

In the apparatus for controlling UEs in FIG. 1, the frequency and the scrambling codes of the signals transmitted by the apparatus are the same as the frequency and the scrambling codes of the signals transmitted by the base station of the source cell; after the UE receives the signals in the process of moving from the source cell to the destination cell, the signals are regarded as being transmitted by the base station of the source cell, and the UE is woken by the information over the PICH and the PCH, and then the UE reads the information configured by the destination cell and carried over the common channel of the signals, and performs corresponding operations according to the read information. The information over the PICH and the PCH wakes up the specified UE. Therefore, among different UEs in the source cell, some are woken up by the base station of the destination cell to perform corresponding operations, and different UEs in the same source cell obtain differentiated services.

Further, the apparatus may control the UEs in the macro cell to perform inter-frequency measurement and reselect a cell. Therefore, the first transmitting unit 401 is specifically adapted to transmit signals at frequency 12, where: f2 is the same as the frequency of signals transmitted by the base station of the source cell, scrambling codes used for transmitting the signals are the same as scrambling codes of the signals transmitted by the base station of the source cell, and a PICH and a PCH in the signals transmitted at the first frequency bear information for waking up a specified UE; a common channel in the signals transmitted at the first frequency bears information configured by the base station of the destination cell; and the information configured by the base station of the destination cell is designed to control the woken specified UE to perform corresponding operations.

The common channel in the signals bears the information configured by the base station of the destination cell in the following way:

A PCH on an SCCPCH in the signals bears BCCH modification info, and the BCCH modification info instructs the woken specified UE to read information on a PCCPCH of the signals; the BCCH on the PCCPCH of the signals bears an inter-frequency measurement threshold and neighboring cell information; the neighboring cell information includes destination cell information; and the inter-frequency measurement threshold and the neighboring cell information instruct the woken specified UE to perform inter-frequency measurement and reselect a destination cell indicated in the neighboring cell information.

The second transmitting unit 402 is specifically adapted to transmit signals at frequency f1, where f1 is different from the frequency used by the macro cell, and the signals transmitted at f1 carry second common channel information.

The apparatus described above can control the UE to reselect a cell, and select a Femtocell as a serving cell, where the Femtocell is generated by the scope covered by the signals transmitted at f1 of the apparatus.

Further, the signals transmitted at the first frequency may be synchronous to the signals transmitted by the macro cell or not.

Persons of ordinary skill in the art should understand that all or part of the steps of the method provided in the embodiments above may be implemented by a program instructing relevant hardware. The program may be stored in computer readable storage media. When the program runs, the program executes the steps of the method specified in any embodiment above. The storage media may be a magnetic disk, Compact Disk Read-Only Memory (CD-ROM), Read-Only Memory (ROM), or Random Access Memory (RAM).

Described above are embodiments of the present invention. Although the present invention is described through some exemplary embodiments, the present invention is not limited to such embodiments. It is apparent that persons skilled in the art can make modifications and variations to the present invention without departing from the spirit and scope of the present invention. The present invention is intended to cover the modifications and variations provided that they fall in the scope of protection defined by the following claims or their equivalents.

What is claimed is:

1. A method for controlling User Equipments (UEs), wherein the method is applicable to a communication system comprising a source cell and a destination cell, and comprises:

transmitting, by a base station of the destination cell, signals at a first frequency, wherein: the first frequency is the same as a frequency of signals transmitted by a base station of the source cell, scrambling codes used for transmitting the signals at the first frequency are the same as scrambling codes of the signals transmitted by the base station of the source cell, and a Paging Indication Channel (PICH) and a Paging Channel (PCH) in the signals transmitted at the first frequency bear information for waking up a specified UE; a common channel in the signals transmitted at the first frequency bears information configured by the base station of the destination cell; and the information configured by the base station of the destination cell is designed to control the woken specified UE to perform corresponding operations, wherein the common channel in the signals transmitted at the first frequency bears the information configured by the base station of the destination cell by:

including Broadcast Control Channel (BCCH) modification info in a PCH on a Subordinate Common Control Physical Channel (SCCPCH) of the signals, wherein the BCCH modification info is adapted to instruct the woken specified UE to read information on a Principal Common Control Physical Channel (PCCPCH) of the signals transmitted at the first frequency; the BCCH on the PCCPCH of the signals bears an inter-frequency measurement threshold and neighboring cell information; the neighboring cell information comprises destination cell information; and the inter-frequency measurement threshold and the neighboring cell information are adapted to instruct woken specified UE to perform inter-frequency measurement and reselect a destination cell indicated in the neighboring cell information.

2. The method according to claim 1, wherein:
the information configured by the base station of the destination cell comprises: a first parameter, adapted to instruct the woken specified UE to perform inter-frequency measurement and reselect a cell; or a second parameter, adapted to instruct the woken specified UE to perform inter-system reselection; or a third parameter, adapted to instruct the woken specified UE to initiate setup of a Radio Resource Control (RRC) connection.

3. The method according to claim 1, wherein:
the signals transmitted at the first frequency are synchronous to the signals transmitted by the base station of the source cell.

4. The method according to claim 1, wherein:
the signals transmitted at the first frequency are not synchronous to the signals transmitted by the base station of the source cell.

5. The method according to claim 1, wherein:
the base station of the destination cell is a Femtocell base station or a home base station; and
the source cell is a macro cell.

6. An apparatus for controlling User Equipments (UEs), wherein the apparatus is applicable to a communication system comprising a source cell and a destination cell, and comprises:
a first transmitting unit, adapted to transmit signals at a first frequency, wherein: the first frequency is the same as a frequency of signals transmitted by a base station of the source cell, scrambling codes used for transmitting the signals at the first frequency are the same as scrambling codes of the signals transmitted by the base station of the source cell, and a Paging Indication Channel (PICH) and a Paging Channel (PCH) in the signals transmitted at the first frequency bear information for waking up a specified UE; a common channel in the signals transmitted at the first frequency bears information configured by the base station of the destination cell; and the information configured by the base station of the destination cell is designed to control the woken specified UE to perform corresponding operations,
wherein the common channel in the signals transmitted at the first frequency bears the information configured by the base station of the destination cell by:
including Broadcast Control Channel (BCCH) modification info in a PCH on a Subordinate Common Control Physical Channel (SCCPCH) of the signals, wherein the BCCH modification info is adapted to instruct the woken specified UE to read information on a Principal Common Control Physical Channel (PCCPCH) of the signals transmitted at the first frequency; the BCCH on the PCCPCH of the signals bears an inter-frequency measurement threshold and neighboring cell information; the neighboring cell information comprises destination cell information; and the inter-frequency measurement threshold and the neighboring cell information are adapted to instruct the woken specified UE to perform inter-frequency measurement and reselect a destination cell indicated in the neighboring cell information.

7. The apparatus according to claim 6, wherein:
the information configured by the base station of the destination cell comprises: a first parameter, adapted to instruct the woken specified UE to perform inter-frequency measurement and reselect a cell; or a second parameter, adapted to instruct the woken specified UE to perform inter-system reselection; or a third parameter, adapted to instruct the woken specified UE to initiate setup of a Radio Resource Control (RRC) connection.

8. The apparatus according to claim 6, wherein:
the signals transmitted at the first frequency are synchronous to the signals transmitted by the base station of the source cell of the UE.

9. The apparatus according to claim 6, wherein:
the signals transmitted at the first frequency are not synchronous to the signals transmitted by the base station of the source cell of the UE.

10. The apparatus according to claim 6, wherein:
the apparatus is a Femtocell base station or a home base station.

* * * * *

UNITED STATES PATENT AND TRADEMARK OFFICE
CERTIFICATE OF CORRECTION

PATENT NO. : 8,509,794 B2
APPLICATION NO. : 13/457028
DATED : August 13, 2013
INVENTOR(S) : Deng et al.

Page 1 of 1

It is certified that error appears in the above-identified patent and that said Letters Patent is hereby corrected as shown below:

In the Claims

Column 9, Line 14, In Claim 1, before "woken" insert -- the --.

Signed and Sealed this
First Day of July, 2014

Michelle K. Lee
*Deputy Director of the United States Patent and Trademark Office*